(12) United States Patent
Tenny et al.

(10) Patent No.: US 9,385,844 B2
(45) Date of Patent: Jul. 5, 2016

(54) METHOD AND APPARATUS FOR SENDING SCHEDULING INFORMATION FOR BROADCAST AND MULTICAST SERVICES IN A CELLULAR COMMUNICATION SYSTEM

(71) Applicant: QUALCOMM Incorporated, San Diego, CA (US)

(72) Inventors: Nathan Edward Tenny, Poway, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/056,181

(22) Filed: Oct. 17, 2013

(65) Prior Publication Data

US 2014/0044093 A1    Feb. 13, 2014

Related U.S. Application Data

(63) Continuation of application No. 12/128,972, filed on May 29, 2008, now Pat. No. 8,670,363.

(60) Provisional application No. 60/940,873, filed on May 30, 2007.

(51) Int. Cl.
*H04L 5/00* (2006.01)
*H04W 72/00* (2009.01)

(52) U.S. Cl.
CPC ............ *H04L 5/0005* (2013.01); *H04L 5/0064* (2013.01); *H04L 5/0092* (2013.01); *H04W 72/005* (2013.01); *H04L 5/0037* (2013.01)

(58) Field of Classification Search
CPC ... H04L 5/0037; H04L 5/0064; H04L 5/0005; H04L 5/0092; H04W 72/005; H04W 36/18; H04W 76/002; H04W 72/042
See application file for complete search history.

(56) References Cited

U.S. PATENT DOCUMENTS 6,421,706 B1    7/2002    McNeill et al.
6,501,745 B1    12/2002    Turina et al.
(Continued)

FOREIGN PATENT DOCUMENTS

CN    1910841 A    2/2007
EP    1507358 A2    2/2005
(Continued)

OTHER PUBLICATIONS

International Search Report and Written Opinion—PCT/US2008/065402, International Search Authority—European Patent Office—Sep. 23, 2008.
(Continued)

*Primary Examiner* — Yee Lam
(74) *Attorney, Agent, or Firm* — Anthony R. Morris

(57) ABSTRACT

Techniques for supporting broadcast, multicast, and unicast services in a cellular system are described. A Node B may multiplex data for broadcast and multicast services and data for unicast services on radio resources available for transmission. The Node B may periodically send scheduling information used to determine the radio resources carrying the broadcast and multicast services. In one design, the Node B may time division multiplex the data for the broadcast and multicast services and the data for the unicast services. The scheduling information may convey time unit(s) used for each broadcast or multicast service. In another design, the Node B may map the data for the broadcast and multicast services to time frequency blocks. The scheduling information may (i) convey the time frequency block(s) used for each broadcast or multicast service or (ii) point to control information conveying the time frequency block(s) used for each service.

22 Claims, 10 Drawing Sheets

(56) References Cited

U.S. PATENT DOCUMENTS

| | | | |
|---|---|---|---|
| 6,957,071 | B1 | 10/2005 | Holur et al. |
| 6,978,144 | B1 | 12/2005 | Choksi |
| 7,318,187 | B2 | 1/2008 | Vayanos et al. |
| 7,346,339 | B2 | 3/2008 | Lee et al. |
| 7,349,703 | B2 | 3/2008 | Yi et al. |
| 7,499,435 | B2 | 3/2009 | Kwak et al. |
| 7,558,228 | B2 | 7/2009 | Lee et al. |
| 2004/0087320 | A1 | 5/2004 | Kim et al. |
| 2004/0103435 | A1 | 5/2004 | Yi et al. |
| 2004/0223623 | A1 | 11/2004 | Lo |
| 2004/0228294 | A1 | 11/2004 | Kim et al. |
| 2004/0229605 | A1 | 11/2004 | Hwang et al. |
| 2005/0037768 | A1 | 2/2005 | Hwang et al. |
| 2005/0074024 | A1 | 4/2005 | Kim et al. |
| 2006/0030342 | A1 | 2/2006 | Hwang et al. |
| 2006/0067281 | A1* | 3/2006 | Kwak et al. ............ 370/337 |
| 2006/0068793 | A1 | 3/2006 | Van Lieshout et al. |
| 2006/0126556 | A1 | 6/2006 | Jiang et al. |
| 2006/0126590 | A1* | 6/2006 | Putcha et al. ............ 370/343 |
| 2006/0146745 | A1 | 7/2006 | Cai et al. |
| 2006/0156370 | A1 | 7/2006 | Parantainen |
| 2007/0054625 | A1* | 3/2007 | Beale ........................ 455/69 |
| 2007/0058595 | A1* | 3/2007 | Classon et al. ........... 370/337 |
| 2007/0086437 | A1 | 4/2007 | DiFazio et al. |
| 2007/0275728 | A1 | 11/2007 | Lohr et al. |
| 2007/0293229 | A1 | 12/2007 | Khan |
| 2008/0285523 | A1 | 11/2008 | Bjorken |
| 2009/0010196 | A1 | 1/2009 | Bui et al. |
| 2009/0016254 | A1 | 1/2009 | Lee et al. |
| 2009/0046617 | A1 | 2/2009 | Tenny et al. |
| 2009/0047942 | A1 | 2/2009 | Cao |
| 2009/0180414 | A1* | 7/2009 | Maeda et al. ............ 370/311 |
| 2009/0225708 | A1 | 9/2009 | Harada et al. |
| 2009/0262699 | A1 | 10/2009 | Wengerter et al. |
| 2009/0291692 | A1 | 11/2009 | Kazmi et al. |
| 2009/0305712 | A1 | 12/2009 | Franceschini et al. |
| 2010/0002617 | A1* | 1/2010 | Seyama ..................... 370/312 |
| 2010/0046409 | A1 | 2/2010 | Lohmar et al. |
| 2010/0062795 | A1 | 3/2010 | Lee |
| 2010/0232333 | A1* | 9/2010 | Higuchi et al. ........... 370/312 |
| 2011/0243056 | A1* | 10/2011 | Jen ............................ 370/312 |

FOREIGN PATENT DOCUMENTS

| | | |
|---|---|---|
| EP | 1521394 A1 | 4/2005 |
| EP | 1585351 | 10/2005 |
| EP | 1665654 A2 | 6/2006 |
| JP | 2006526352 | 11/2006 |
| KR | 20050106845 A | 11/2005 |
| RU | 2233045 C2 | 7/2004 |
| RU | 2003129811 A | 4/2005 |
| RU | 2004138290 | 6/2005 |
| WO | 9923844 | 5/1999 |
| WO | 0207162 A1 | 1/2002 |
| WO | 03065648 A2 | 8/2003 |
| WO | 03088570 A1 | 10/2003 |
| WO | 03101141 A1 | 12/2003 |
| WO | 2004017540 A1 | 2/2004 |
| WO | 2004102831 A1 | 11/2004 |
| WO | 2005027391 A2 | 3/2005 |
| WO | 2005099133 A1 | 10/2005 |
| WO | 2005101681 A1 | 10/2005 |
| WO | 2006104335 A2 | 10/2006 |
| WO | 2007023045 A1 | 3/2007 |
| WO | 2007052916 A1 | 5/2007 |
| WO | 2007052921 A1 | 5/2007 |
| WO | 2008049449 A1 | 5/2008 |

OTHER PUBLICATIONS

LG Electronics: "LTE MBMS Transmission R2-071922" 3GPP TSG-RAN WG2 #58, May 11, 2007 pp. 1-2, XP002495415.

Taiwan Search Reportt—TW097120391—TIPO—Apr. 17, 2012.

Universal Mobile Telecommunications System (UMTS); Introduction of the Multimedia Broadcast/Multicast Service (MBMS) in the Radio Access Network (RAN); Stage 2 (3GPP TS 25.346 version 7.3.0 Release 7); ETSI TS 125 346 ETSI Standards, Lis, Sophia Antipolis Cedex, France, vol. 3-R2, No. V7.3.0, Mar. 1, 2007, XP014037922 ISSN: 0000-0001 pp. 15-16 pp. 23,31,46.

Universal Mobile Telecommunications System (UMTS); Radio Resource Control(RRG); Protocol specification (3GPP TS 25.331 version 7.4.0 Release 7); ETSI. TS 125 331 ETSI Standards. Lis, Sophia Antipolis Cedex. France, vol. 3-R2, No. V7.4.0, Mar. 1, 2007, XP014037920 ISSN: 0000-0001 pp. 46,72-73 pp. 384-385 pp. 389-390 pp. 96,4.

Yuan Y et al., "A Secure Service Discovery Protocol for MANET," The 14th IEEE 2003 International Symposium on Personal, Indoor and Mobile Radio Communication Proceedings, pp. 502-506.

Alcatel-Lucent, "Transmission of E-MBMS control information," 3GPP TSG-RAN WG2 #58bis R2-072357,Jun. 25, 2007.

Ericsson, "MBMS Service Announcement," 3GPP TSG-RAN WG2 #58bis R2-072573,Jun. 25, 2007.

Nokia Siemens Networks, Nokia, "MCCH Control Signalling," 3GPP TSG-RAN WG2 #58bis R2-072410,Jun. 25,2007.

NSN, Nokia, "MCCH Control," 3GPP TSG-RAN WG2 #58 R2-071734,May 7,2007.

3GPP TS 36.300, "Evolved Universal Terrestrial Radio Access (E-UTRA) and Evolved Universal Terrestrial Radio Access Network (E-UTRAN); Overall description; Stage 2 (Release 8)", V8.0.0, Mar. 2007.

* cited by examiner

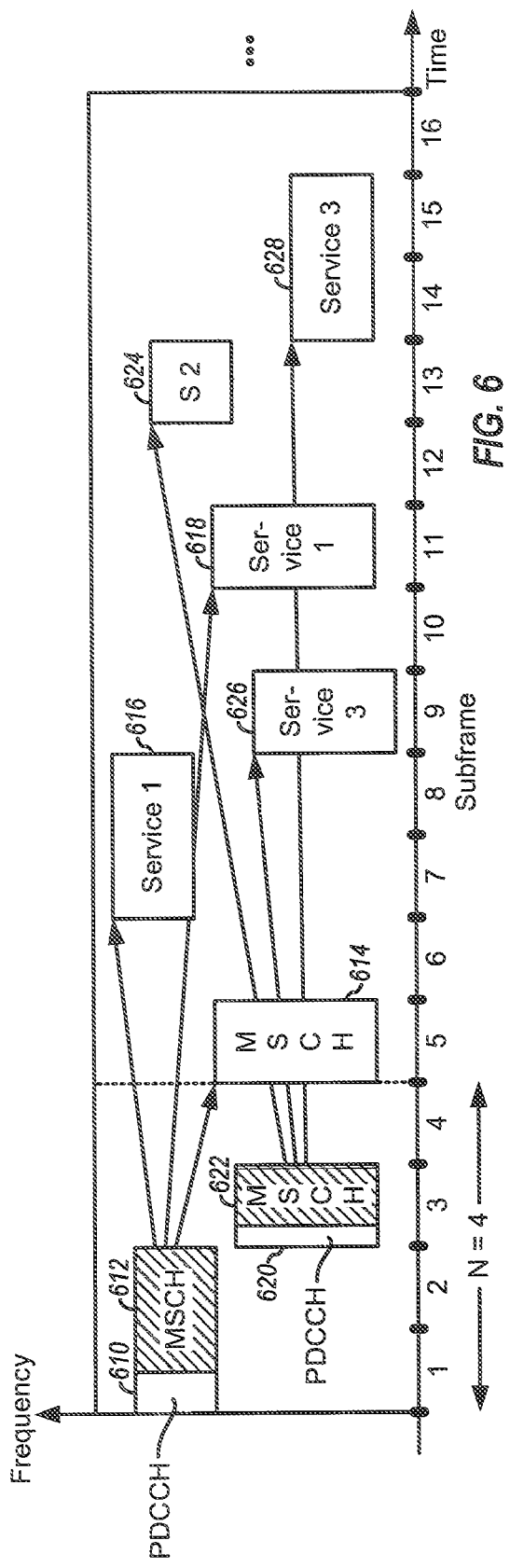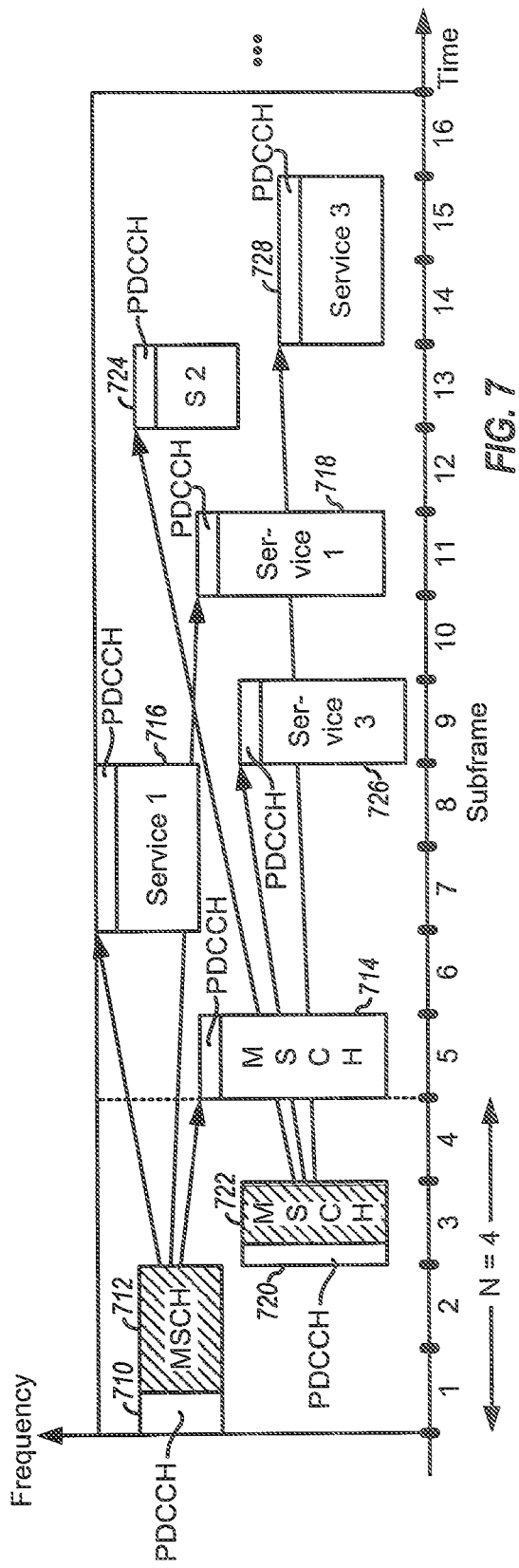

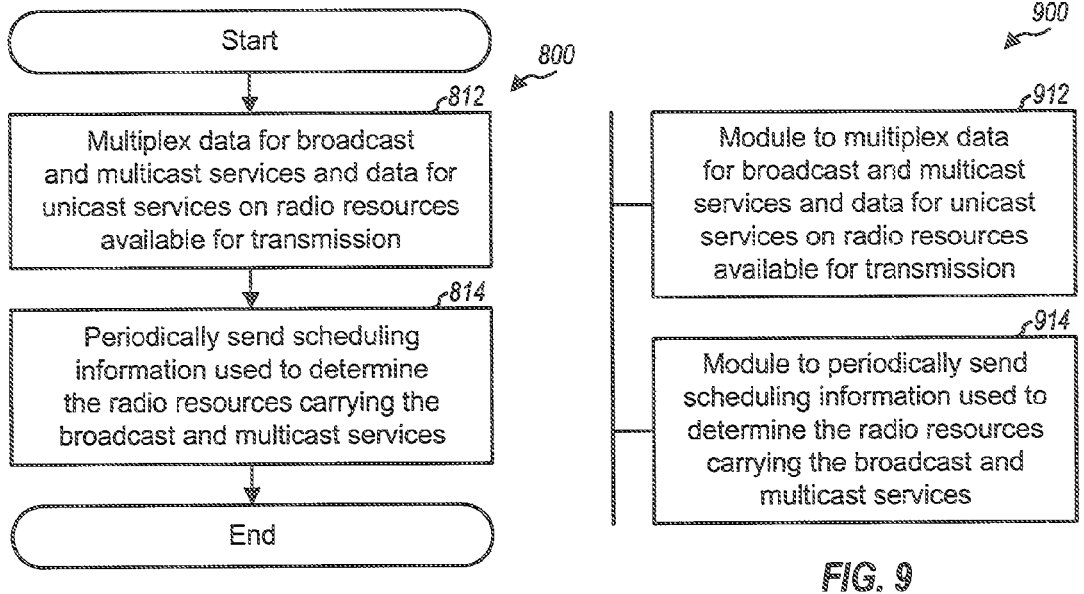
FIG. 8
FIG. 9
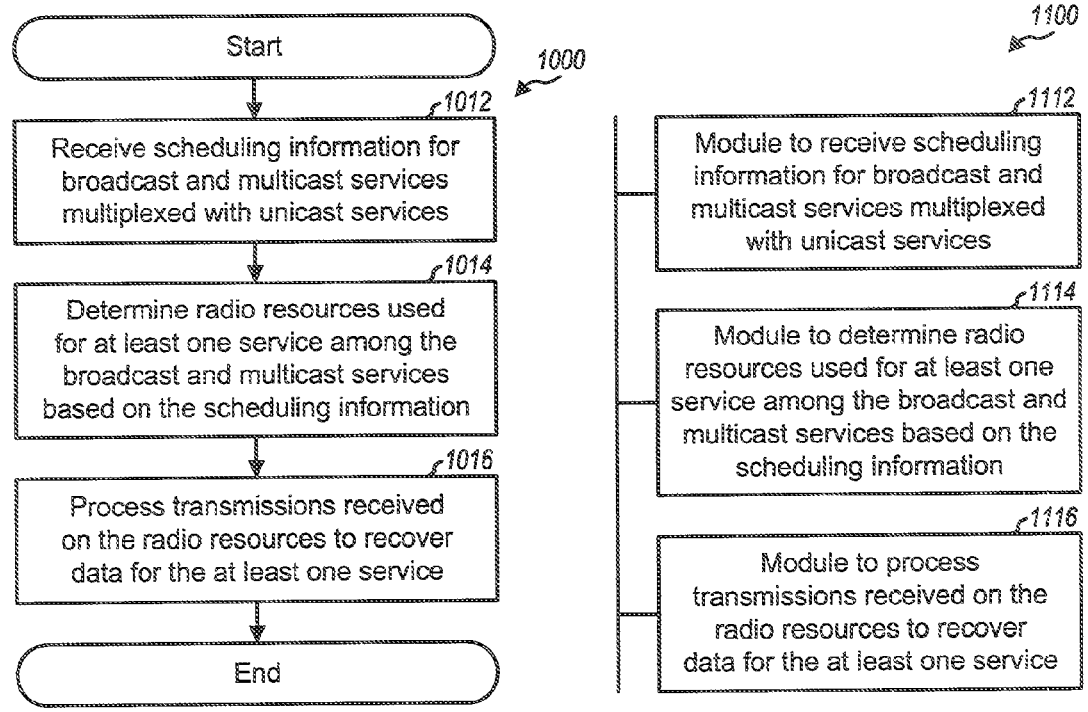
FIG. 10
FIG. 11

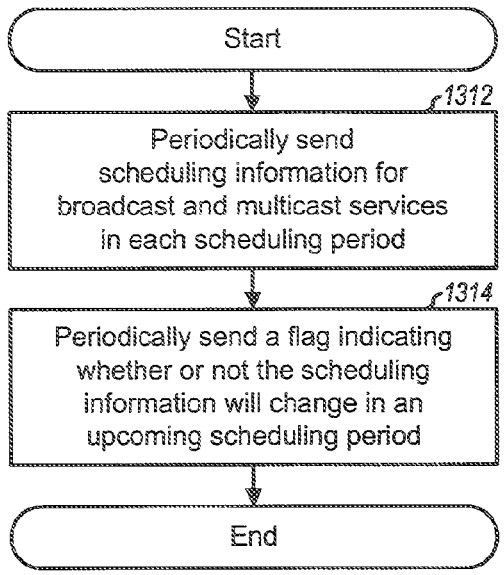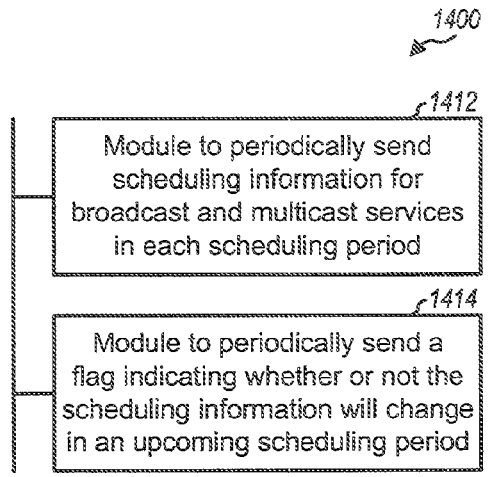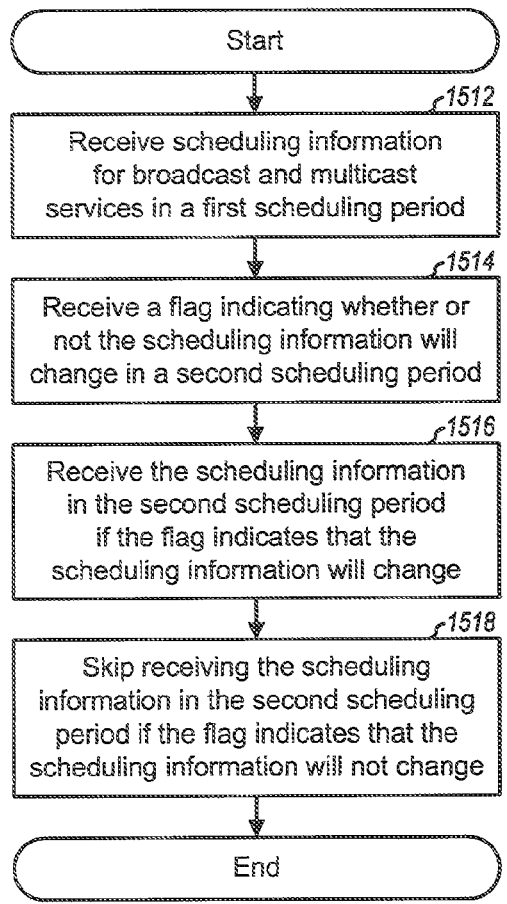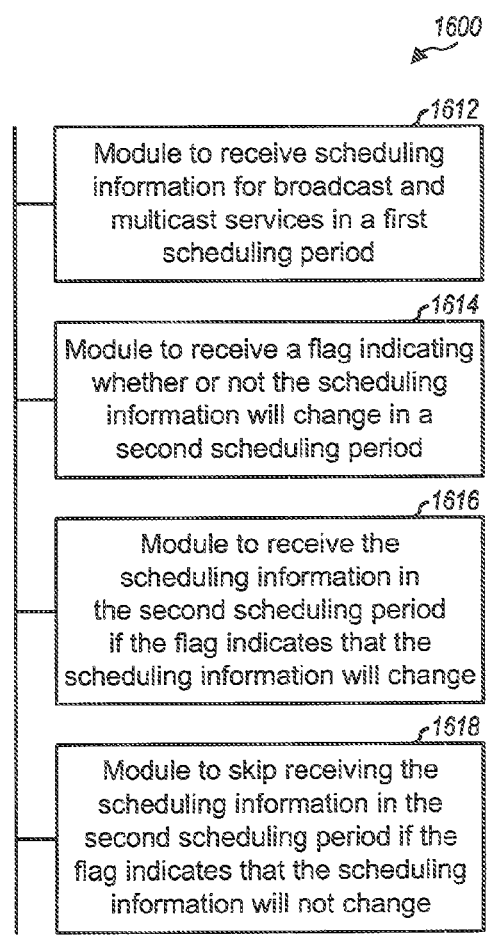
FIG. 13
FIG. 14
FIG. 15
FIG. 16

METHOD AND APPARATUS FOR SENDING SCHEDULING INFORMATION FOR BROADCAST AND MULTICAST SERVICES IN A CELLULAR COMMUNICATION SYSTEM

The present application is a continuation of U.S. application Ser. No. 12/128,972, entitled "METHOD AND APPARATUS FOR SENDING SCHEDULING INFORMATION FOR BROADCAST AND MULTICAST SERVICES IN A CELLULAR COMMUNICATION SYSTEM", filed on May 29, 2008, which in turn claims priority to provisional U.S. Application Ser. No. 60/940,873, entitled "A SCHEDULING SCHEME FOR E-MBMS," filed May 30, 2007, each of which is assigned to the assignee hereof and incorporated herein by reference in its entirety.

BACKGROUND

I. Field

The present disclosure relates generally to communication, and more specifically to techniques for supporting broadcast and multicast services in a cellular communication system.

II. Background

A cellular communication system can support bi-directional communication for multiple users by sharing the available system resources. Cellular systems are different from broadcast systems that can mainly or only support uni-directional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. It is desirable to efficiently support broadcast, multicast, and unicast services in the cellular system.

SUMMARY

Techniques for supporting broadcast, multicast, and unicast services in a cellular system are described herein. In an aspect, a Node B may multiplex data for broadcast and multicast services and data for unicast services on radio resources available for transmission. The radio resources may comprise time, frequency, power, code, and/or other resources usable for transmission over the air. The Node B may periodically send scheduling information that may be used by the users to determine the radio resources carrying the broadcast and multicast services. The scheduling information may convey where and possibly how the broadcast and multicast services are sent.

In one design, the Node B may time division multiplex (TDM) the data for the broadcast and multicast services and the data for the unicast services. Each broadcast or multicast service may be sent in at least one time unit, and the scheduling information may convey the time unit(s) used for each broadcast or multicast service. In another design, the Node B may map the data for the broadcast and multicast services to time frequency blocks. The scheduling information may (i) convey the time frequency block(s) used for each broadcast or multicast service or (ii) point to control information that may convey the time frequency block(s) used for each service.

The scheduling information may be sent in each scheduling period and may convey the radio resources used for the broadcast and multicast services in the current or subsequent scheduling period. The Node B may also periodically send a change flag that indicates whether or not the scheduling information will change in an upcoming scheduling period.

Various aspects and features of the disclosure are described in further detail below.

BRIEF DESCRIPTION OF THE DRAWINGS

FIGS. 6 and 7 show two designs of sending scheduling information in the single-cell mode.
FIG. 8 shows a process for sending broadcast, multicast, and unicast services.
FIG. 9 shows an apparatus for sending broadcast, multicast, and unicast services.
FIG. 10 shows a process for receiving services.
FIG. 11 shows an apparatus for receiving services.
FIG. 13 shows a process for sending scheduling information.
FIG. 14 shows an apparatus for sending scheduling information.
FIG. 15 shows a process for receiving scheduling information.
FIG. 16 shows an apparatus for receiving scheduling information.

DETAILED DESCRIPTION

The techniques described herein may be used for various cellular communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
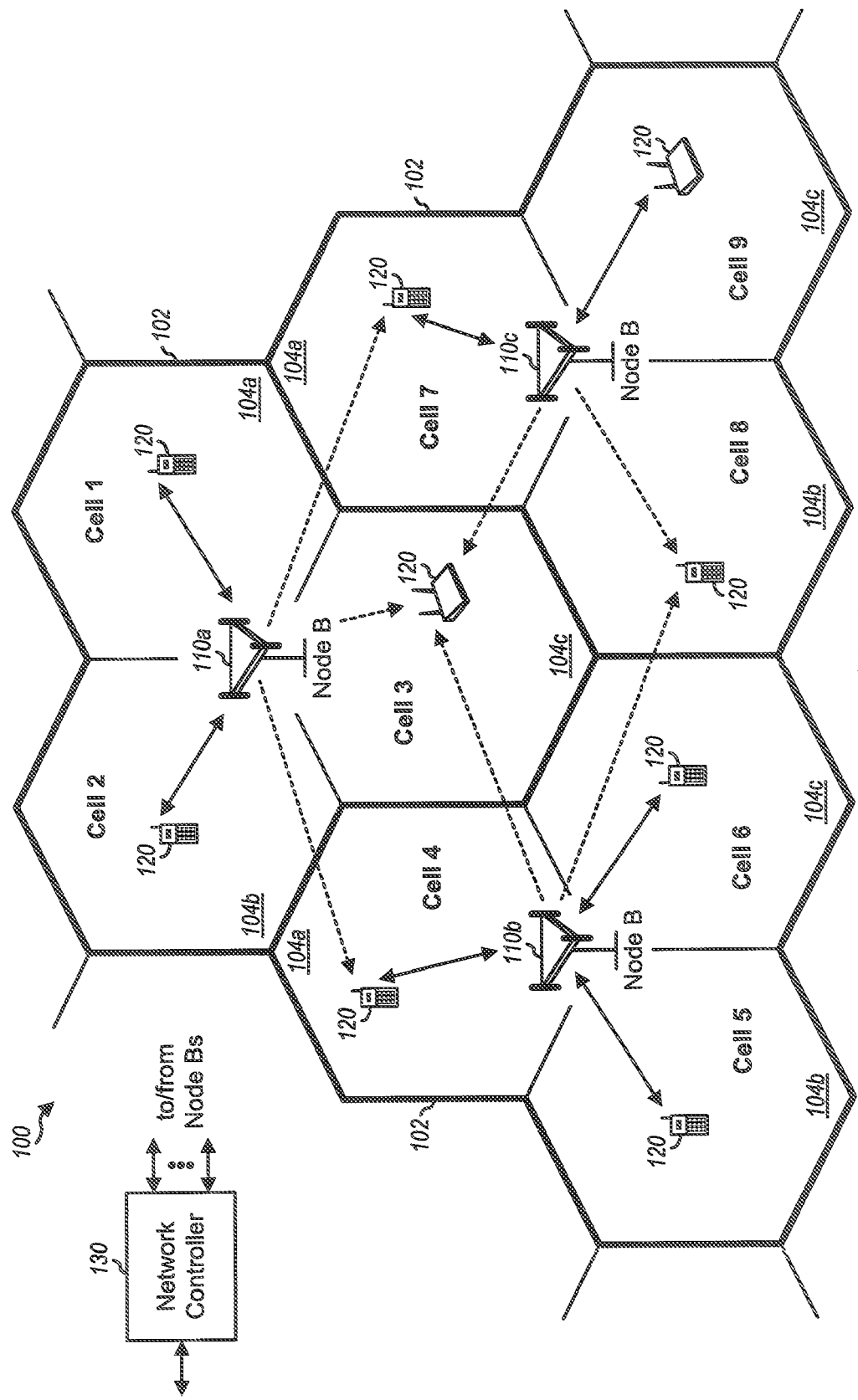
FIG. 1 shows a cellular communication system.

FIG. 1 shows a cellular communication system 100, which may be an LTE system. System 100 may include a number of Node Bs and other network entities. For simplicity, only three Node Bs 110a, 110b and 110c are shown in FIG. 1. A Node B may be a fixed station used for communicating with the user equipments (UEs) and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, e.g., for broadcast and/or multicast services. The terms "UE" and "user" are used interchangeably herein.

Figure 2:
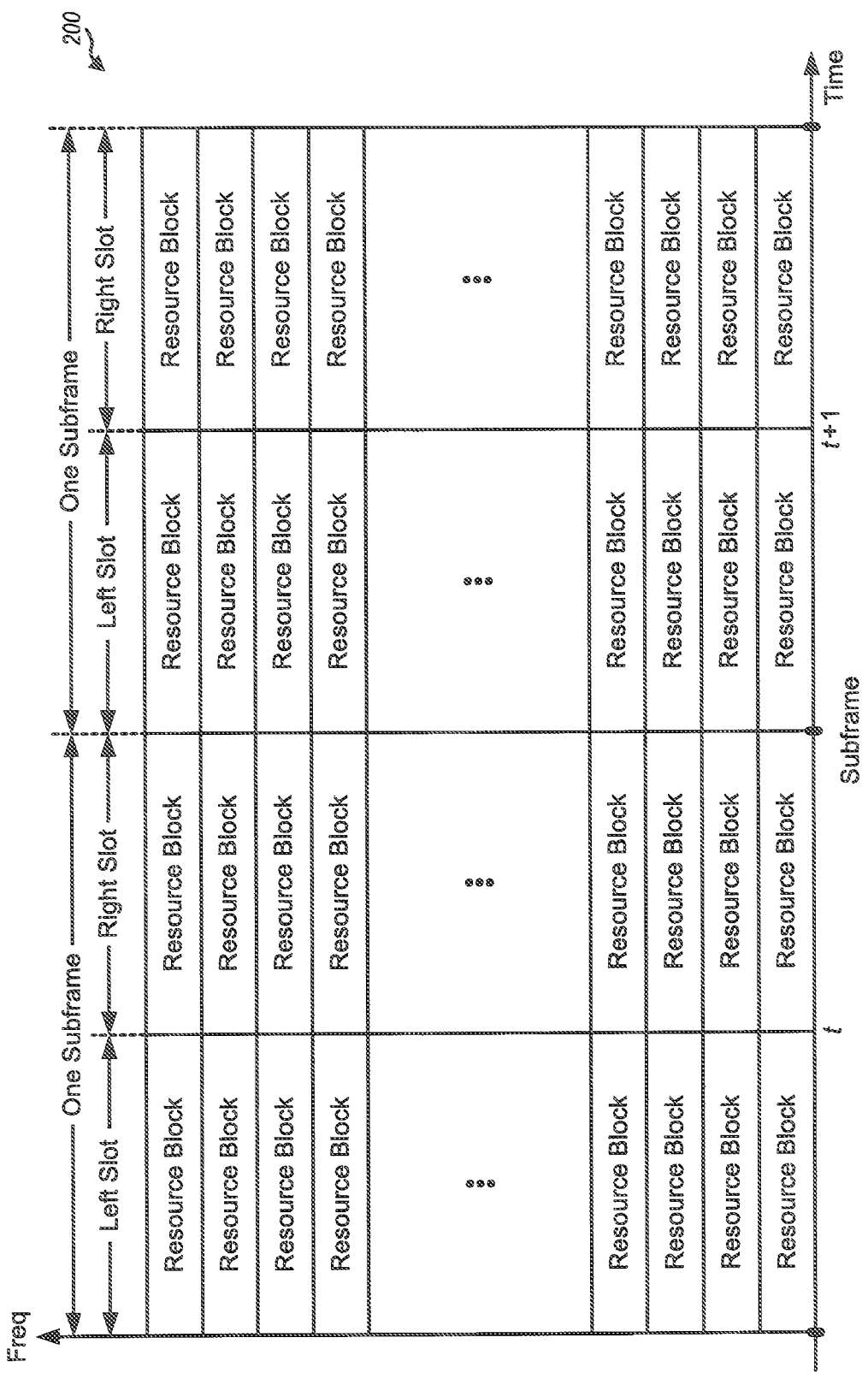
FIG. 2 shows an example transmission structure.

FIG. 2 shows an example transmission structure 200 that may be used for the downlink in system 100. The transmission timeline may be partitioned into units of radio frames. Each radio frame may have a predetermined duration (e.g., 10 milliseconds (ms)) and may be partitioned into 10 subframes. Each subframe may include two slots, and each slot may include a fixed or configurable number of symbol periods, e.g., six or seven symbol periods.

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (E-MBMS) for multiple UEs as well as unicast services for individual UEs. A service for E-MBMS may be referred to as an E-MBMS service and may be a broadcast service or a multicast service.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Channel | Name | Type | Description |
| --- | --- | --- | --- |
| Dynamic Broadcast Channel | D-BCH | L | Carry system information. |
| E-MBMS Scheduling Channel | MSCH | L | Carry scheduling information and possibly control information for E-MBMS services. |
| E-MBMS Traffic Channel | MTCH | L | Carry data for E-MBMS services. |
| E-MBMS Control Channel | MCCH | L | Carry configuration information for E-MBMS services. |
| Multicast Channel | MCH | T | Carry the MTCH and MCCH. |
| Downlink Shared Channel | DL-SCH | T | Carry the MTCH and other logical channels. |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH. |
| Physical Downlink Control Channel | PDCCH | P | Carry control information for the DL-SCH. |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
| --- | --- | --- |
| System Information | D-BCH and PBCH | Information pertinent for communicating with and/or receiving data from the system. |
| Scheduling Information | MSCH | Information indicating when and possibly where and how different services are sent. |
| Configuration Information | MCCH | Information used to receive the services, e.g., for bearer configurations such as traffic class, RLC configurations, lower layer settings, etc. |
| Control Information | PDCCH or MSCH | Information used to receive transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for E-MBMS, which may include a multi-cell mode and a single-cell mode. The multi-cell mode may have the following characteristics:
  Content for broadcast or multicast services is transmitted synchronously across multiple cells,
  Radio resources for broadcast and multicast services are allocated by an MBMS Coordinating Entity (MCE), which may be logically located above the Node Bs,
  Content for broadcast and multicast services is mapped on the MCH at a Node B, and Time division multiplexing (e.g., at subframe level) of data for broadcast, multicast, and unicast services.

The single-cell mode may have the following characteristics:

Each cell transmits content for broadcast and multicast services without synchronization with other cells, Radio resources for broadcast and multicast services are allocated by the Node B, Content for broadcast and multicast services is mapped on the DL-SCH, and Data for broadcast, multicast, and unicast services may be multiplexed in any manner allowed by the structure of the DL-SCH.

In general, E-MBMS services may be supported with the multi-cell mode, the single-cell mode, and/or other modes. The multi-cell mode may be used for E-MBMS multicast/broadcast single frequency network (MBSFN) transmission, which may allow a UE to combine signals received from multiple cells in order to improve reception performance.

Figure 3:
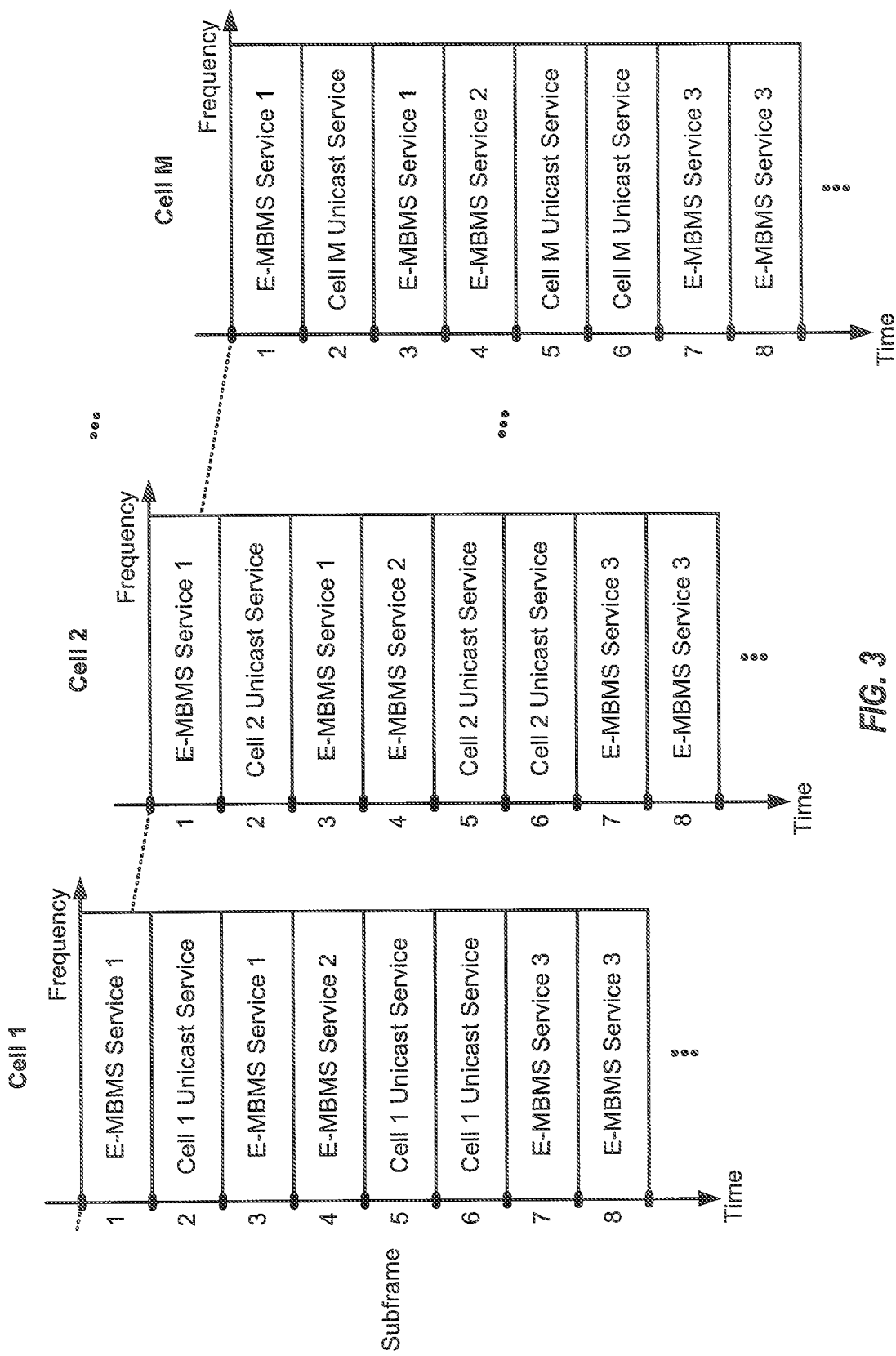
FIG. 3 shows example transmissions of different services in a multi-cell mode.

FIG. 3 shows example transmissions of E-MBMS and unicast services by M cells 1 through M in the multi-cell mode, where M may be any integer value. For each cell, the horizontal axis may represent time, and the vertical axis may represent frequency. In one design of E-MBMS, which is assumed for much of the description below, the transmission time line for each cell may be partitioned into time units of subframes. In other designs of E-MBMS, the transmission time line for each cell may be partitioned into time units of other durations. In general, a time unit may correspond to a subframe, a slot, a symbol period, multiple symbol periods, multiple slots, multiple subframes, etc.

In the example shown in FIG. 3, the M cells transmit three E-MBMS services 1, 2 and 3. All M cells transmit E-MBMS service 1 in subframes 1 and 3, E-MBMS service 2 in subframe 4, and E-MBMS service 3 in subframes 7 and 8. The M cells transmit the same content for each of the three E-MBMS services. Each cell may transmit its own unicast service in subframes 2, 5 and 6. The M cells may transmit different contents for their unicast services.

Figure 4:
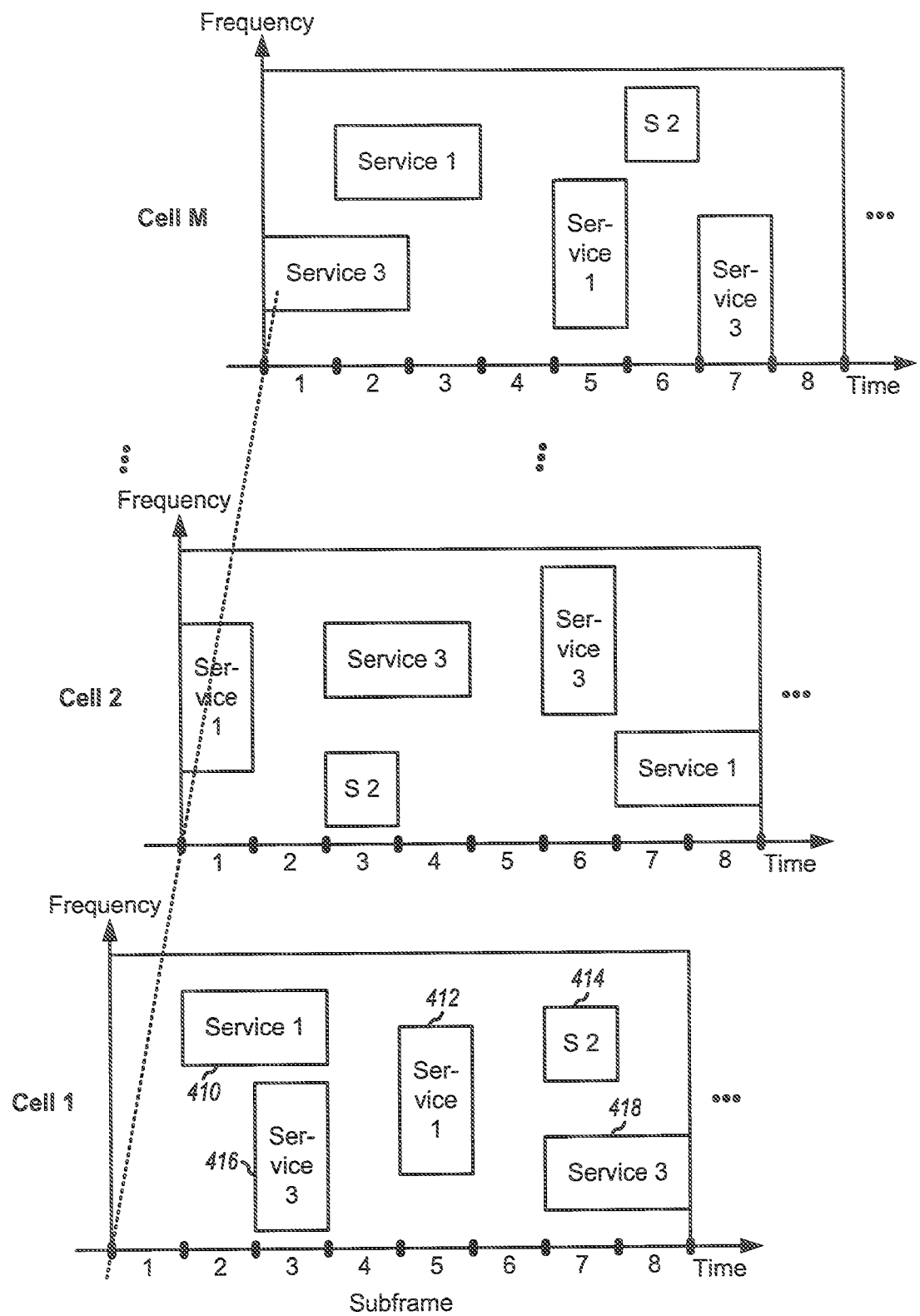
FIG. 4 shows example transmissions of different services in a single-cell mode.

FIG. 4 shows example transmissions of E-MBMS and unicast services by M cells in the single-cell mode. For each cell, the horizontal axis may represent time, and the vertical axis may represent frequency. In the example shown in FIG. 4, the M cells transmit three E-MBMS services 1, 2 and 3. Cell 1 transmits E-MBMS service 1 in two time frequency blocks 410 and 412, E-MBMS service 2 (denoted as "S 2") in a time frequency block 414, and E-MBMS service 3 in two time frequency blocks 416 and 418. Each remaining cell transmits E-MBMS service 1 in two time frequency blocks, E-MBMS service 2 in one time frequency block, and E-MBMS service 3 in two time frequency blocks.

In general, an E-MBMS service may be sent in any number of time frequency blocks. Each time frequency block may have any dimension and may cover any number of subcarriers and any number of symbol periods. The size of each time frequency block may be dependent on the amount of data to send and possibly other factors. The M cells may transmit the three E-MBMS services 1, 2 and 3 in time frequency blocks that may not be aligned in time and frequency, as shown in FIG. 4. Furthermore, the M cells may transmit the same or different contents for the three E-MBMS services. Each cell may transmit its own unicast service in remaining time frequency resources not used for the three E-MBMS services. The M cells may transmit different contents for their unicast services.

FIGS. 3 and 4 show example designs of transmitting E-MBMS services in the multi-cell mode and the single-cell mode. E-MBMS services may also be transmitted in other manners in the multi-cell and single-cell modes, e.g., using time division multiplexing (TDM), frequency division multiplexing (FDM), some other multiplexing schemes, or any combination thereof.

In an aspect, scheduling information for E-MBMS services may be sent periodically on a scheduling channel such as the MSCH. In one design, the MSCH may be mapped to the MCH in the multi-cell mode or the DL-SCH in the single-cell mode. The MSCH may also be mapped to other transport channels.

In one design, the MSCH may be transmitted periodically in each scheduling period and may carry scheduling information used to receive E-MBMS services in that scheduling period. In general, a scheduling period may cover any time duration, which may be selected based on various factors such as channel switching speed, battery power saving, etc. A UE may change channel in the middle of a scheduling period and may need to wait until the next scheduling period in order to receive scheduling information for the new channel and then start receiving data from this channel. A shorter scheduling period may improve channel switching speed. Conversely, a longer scheduling period may reduce the number of times that the UE need to receive or check the MSCH, which may reduce battery power consumption of the UE. In one design, the scheduling period may be a superframe, which may be 500 ms, one second, or some other suitable duration. The scheduling period for the multi-cell mode may or may not be equal to the scheduling period for the single-cell mode.

In one design, the MSCH may be sent in the first N subframes of each scheduling period. N may be a fixed value (e.g., specified by a standard) and known a priori by all UEs. Alternatively, N may be a configurable value and conveyed in the system information, which may be sent on the D-BCH or some other channel. The modulation and coding for the MSCH may be fixed (e.g., specified by a standard) or may be configurable (e.g., conveyed on the D-BCH).

In one design, the MSCH may be sent on all available radio resources in the first N subframes of a scheduling period. The remaining subframes in the scheduling period may carry data and/or other information for broadcast, multicast, and/or unicast services. In another design, the MSCH may be sent on a subset of the radio resources in the first N subframes. The radio resources used for the MSCH may be conveyed in the system information or the control information or may be made known to the UEs in other manners. The remaining radio resources in the scheduling period may be used to send data and/or other information for broadcast, multicast, and/or unicast services.

Figure 5:
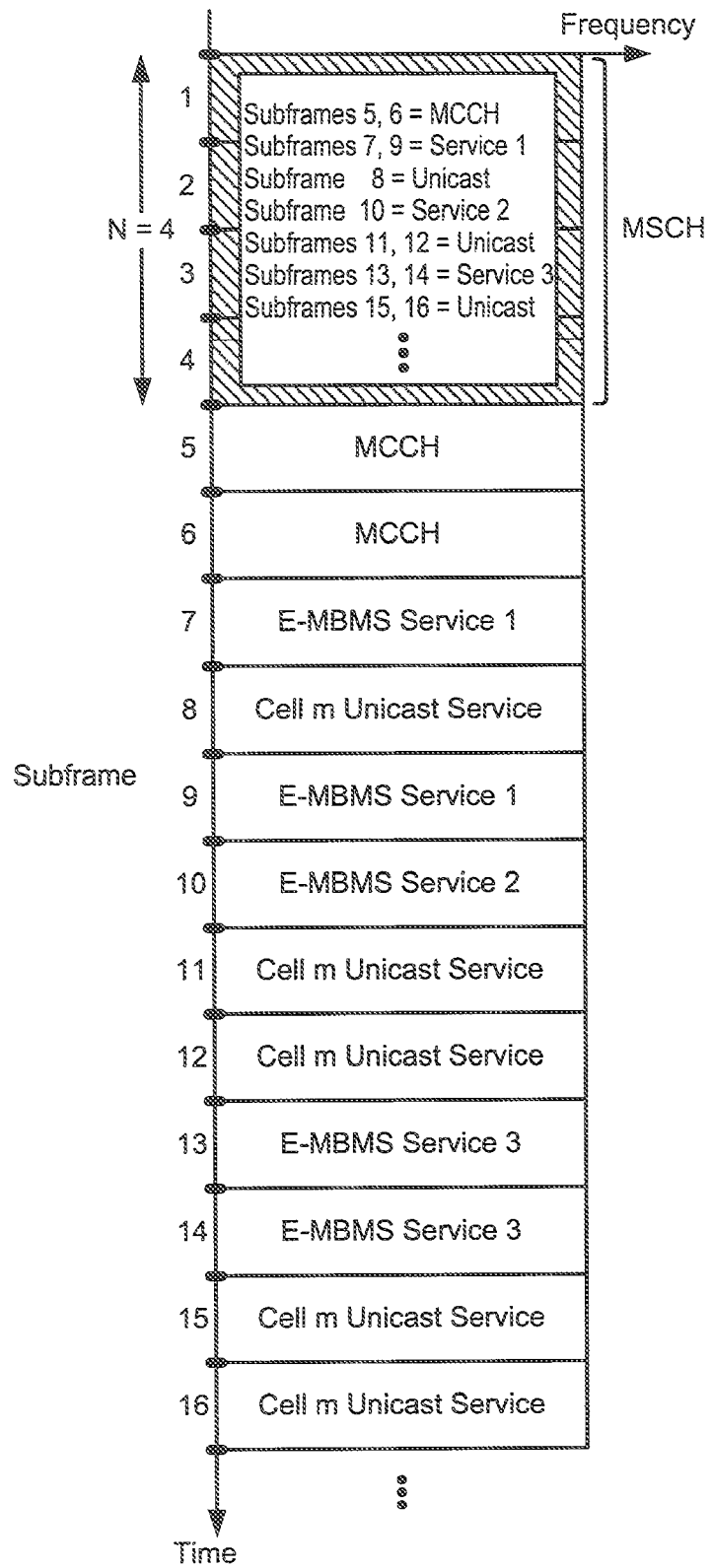
FIG. 5 shows a design of sending scheduling information in the multi-cell mode.

FIG. 5 shows a design of sending the MSCH in the multi-cell mode. In this design, the MSCH is sent in the first N=4 subframes of a scheduling period and carries scheduling information for all E-MBMS services in the scheduling period. The MSCH may also carry scheduling information for the MCCH, which may be considered as an E-MBMS service with regard to the scheduling information. The MCCH may carry configuration information for the E-MBMS services. The configuration information may be semi-static and may convey bearer configurations, mapping of service identifiers (IDs) to logical channel IDs, and/or other parameters (e.g., modulation and coding) for the E-MBMS services.

The scheduling information may be provided in various formats. In one design that is shown in FIG. 5, the scheduling information is subframe centric and conveys which MBMS service (if any) is sent in each subframe of the scheduling period. In the example shown in FIG. 5, the scheduling information indicates that subframes 5 and 6 carry the MCCH, subframes 7 and 9 carry E-MBMS service 1, subframe 8 carries unicast service, subframe 10 carries E-MBMS service 2, subframes 11 and 12 carry unicast service, subframes 13 and 14 carry E-MBMS service 3, subframes 15 and 16 carry unicast service, etc. The scheduling information may convey subframes for both E-MBMS and unicast services (as shown in FIG. 5) or subframes for only E-MBMS services.

In another design, the scheduling information is service centric and conveys which subframes are used for each E-MBMS service. In the example shown in FIG. 5, the scheduling information may indicate that the MCCH is sent in subframes 5 and 6, E-MBMS service 1 is sent in subframes 7 and 9, E-MBMS service 2 is sent in subframe 10, E-MBMS service 3 is sent in subframes 13 and 14, and unicast service is sent in subframes 8, 11, 12, 15 and 16. The scheduling information may also convey the subframes used for the E-MBMS services in other manners.

The MSCH may convey the locations (or subframes) of the E-MBMS services, as described above. In one design, the MSCH may also carry control information used to receive the E-MBMS services. In this design, no control information may be sent in the subframes used for E-MBMS services. In another design, control information used to receive the E-MBMS services may be sent in the subframes in which these services are sent.

Each E-MBMS service may be associated with a service ID and may be sent on a logical channel. The mapping of E-MBMS service IDs to logical channel IDs may be performed by higher layers and provided, e.g., in a service guide or some other upper-layer signaling. The service-to-channel mapping may be sent in a broadcast or unicast manner to the UEs. In one design, the scheduling information may convey the subframes used for different logical channel IDs. The UEs may obtain the service-to-channel mapping, determine the logical channel IDs for E-MBMS services of interest, and determine the subframes used for these logical channel IDs from the scheduling information. In another design, the scheduling information may convey the subframes used for different service IDs, without the need for an intermediate mapping to be signaled explicitly.

In one design, the number of subframes (N), the modulation and coding scheme, and other parameters for the MSCH may be known a priori by the UEs (e.g., specified in a standard). In this design, the UEs may receive the MSCH in each scheduling period based on the known information for the MSCH. In another design, the number of subframes, the modulation and coding scheme, and/or other parameters for the MSCH may be conveyed in the system information sent on the D-BCH. In this design, the UEs may first receive the system information from the D-BCH, determine pertinent information for the MSCH, and receive the MSCH based on this pertinent information.

FIG. 6 shows a design of sending the MSCH in the single-cell mode. The MSCH may be mapped to the DL-SCH, which may in turn be mapped to the PDSCH. The MSCH may be sent in the first N subframes of each scheduling period and may occupy only some resource blocks in these N subframes (as shown in FIG. 6) or all available resource blocks in the N subframes. N may be a fixed value or may be conveyed in the system information. In one design, the resource blocks used for the MSCH may be conveyed by control information sent on the PDCCH associated with the PDSCH, as shown in FIG. 6.

In general, any number of MTCHs may be used to carry data for E-MBMS services, and any number of MCCHs may be used to carry configuration information for the E-MBMS services. The data for each E-MBMS service may be sent on one MTCH, and the configuration information for each E-MBMS service may be sent on one MCCH. In one design, the MTCHs and MCCHs for the E-MBMS services may be sent starting in subframe N+1 of the scheduling period after the MSCH has been sent, as shown in FIG. 6. The MTCHs and MCCHs may be mapped to the DL-SCH and may be sent in an assortment of resource blocks that may be dispersed throughout the scheduling period. The resource blocks used for the MTCHs and MCCHs may be conveyed in several manners. In the design shown in FIG. 6, the resource blocks for the MTCHs and MCCHs may be conveyed by the scheduling information sent on the MSCH. In this design, the scheduling information comprises control information, and the MSCH may effectively function as a collected PDCCH for all resource blocks carrying MBMS services in the scheduling period. The resource blocks for the E-MBMS services utilize PDCCH-less transmission, which means that no control information is sent on the PDCCH for these resource blocks.

In the example shown in FIG. 6, a PDCCH transmission 610 may provide control information (e.g., resource block assignment and/or other parameters) for an MSCH transmission 612. MSCH transmission 612 may provide scheduling information (e.g., control information such as resource block assignments and/or other parameters) for an MCCH transmission 614 and MTCH transmissions 616 and 618 for E-MBMS service 1. A PDCCH transmission 620 may provide control information for an MSCH transmission 622. MSCH transmission 622 may provide scheduling information for an MTCH transmission 624 for E-MBMS service 2 and MTCH transmissions 626 and 628 for E-MBMS service 3. The MSCH transmissions may be for a single MSCH or different MSCHs. Similarly, the PDCCH transmissions may be for a single PDCCH or different PDCCHs.

FIG. 7 shows another design of sending the MSCH in the single-cell mode. In this design, the MSCH may be sent in the first N subframes of each scheduling period, and the resource blocks used for the MSCH may be conveyed by the PDCCH. The scheduling information sent on the MSCH may indicate the subframes in which the MCCH and the E-MBMS services are sent. The PDCCH may be sent in each subframe indicated by the MSCH and may convey control information (e.g., resource block assignments and/or other parameters) for the MCCH and/or MTCH transmissions sent in that subframe. In this design, the MSCH may effectively function as a pointer to the PDCCH transmissions, which in turn point to the resource blocks used for E-MBMS services in the scheduling period.

In the example shown in FIG. 7, a PDCCH transmission 710 may provide control information (e.g., resource block assignment and/or other parameters) for an MSCH transmission 712. MSCH transmission 712 may provide scheduling information for PDCCH transmissions for the MCCH and E-MBMS service 1. These PDCCH transmissions may provide control information (e.g., resource block assignments and/or other parameters) for an MCCH transmission 714 and MTCH transmissions 716 and 718 for E-MBMS service 1. A PDCCH transmission 720 may provide control information for an MSCH transmission 722. MSCH transmission 722 may provide scheduling information for PDCCH transmissions for E-MBMS services 2 and 3. These PDCCH transmissions may provide control information for an MTCH transmission 724 for E-MBMS service 2 and MTCH transmissions 726 and 728 for E-MBMS service 3.

FIGS. 6 and 7 show example transmissions of the MSCH, MCCH and MTCH. In general, any number of MSCH transmissions may be sent in each scheduling period. Any number of MTCH and MCCH transmissions may also be sent in each scheduling period, and any number of MTCH transmissions may be sent for each E-MBMS service. Each transmission may occupy a time frequency block of any dimension.

A UE may know the number of subframes (N), the modulation and coding scheme, and other parameters for the MSCH or may obtain this information from the D-BCH. The UE may then receive the PDCCH in the N subframes, obtain control information for the MSCH, and receive the MSCH based on the control information. For the design shown in FIG. 6, the UE may obtain scheduling information from the MSCH and may receive the MCCH and/or MTCH transmissions of interest based on the scheduling information. The scheduling information may include control information (e.g., resource block assignments and/or other parameters) normally sent on the PDCCH for the MCCH and/or MTCH transmissions. The MCCH may carry configuration information (which may be provided on a per-service basis) used to receive the E-MBMS services. The configuration information may change infrequently, and it may not be necessary to re-read this information for every MTCH transmission.

For the design shown in FIG. 7, the UE may obtain scheduling information from the MSCH and may receive the PDCCH based on the scheduling information. In this design, the scheduling information may include a resource block pointer, a subframe index, or some other information to find the PDCCH. The UE may then process the PDCCH to obtain control information and may receive the MCCH and/or MTCH transmissions based on the control information.

For both designs in FIGS. 6 and 7, the information for receiving the MCCH and MTCH transmissions may be reduced by constraining the transmissions of the MCCHs and MTCHs. For example, if the MCCH and MTCH transmissions are sent in complete subframes (e.g., as shown in FIG. 4), then the MSCH may carry subframe indices for the MCCH and MTCH transmissions.

The MSCH may be sent at the start of each scheduling period, as described above and shown in FIGS. 5 to 7. The MSCH may also be sent prior to each scheduling period, e.g., in the last N subframes of the previous scheduling period. In any general, the MTCH may be sent periodically in each scheduling period and may carry scheduling information for that scheduling period and/or a subsequent scheduling period.

FIG. 8 shows a design of a process 800 for sending broadcast, multicast, and unicast services in a cellular communication system. Process 800 may be performed by a Node B (as described below) or some other entity. The Node B may multiplex data for broadcast and multicast services and data for unicast services on radio resources available for transmission (block 812). The Node B may also send configuration information used to receive the broadcast and multicast services, e.g., on one or more MCCHs. The configuration information may be considered as another broadcast service. The Node B may periodically send scheduling information used to determine radio resources carrying the broadcast and multicast services (block 814). The scheduling information may convey where the broadcast and multicast services are sent, e.g., the time units or time frequency blocks used for these services. The scheduling information may also convey how the broadcast and multicast services are sent, e.g., control information such as modulation and coding used for the broadcast and multicast services.

In one design of block 812, the Node B may time division multiplex the data for the broadcast and multicast services and the data for the unicast services, e.g., as shown in FIG. 5. Each broadcast or multicast service may be sent in at least one time unit. The unicast services may be sent in time units not used for the broadcast and multicast services. In this design, the scheduling information may convey the time unit(s) used for each broadcast or multicast service.

In another design of block 812, the Node B may map the data for the broadcast and multicast services to time frequency blocks. The Node B may map the data for the unicast services to remaining radio resources not used for the broadcast and multicast services. In one design, the scheduling information may convey at least one time frequency block used for each broadcast or multicast service, e.g., as shown in FIG. 6. In another design, the scheduling information may convey the location of control information, and the control information may convey at least one time frequency block used for each broadcast or multicast service, e.g., as shown in FIG. 7. For example, the scheduling information may convey the time units in which the broadcast and multicast services are sent, and the control information in each time unit may convey the time frequency blocks used for broadcast and multicast services sent in that time unit.

In one design, the Node B may send the scheduling information on all available radio resources in the first N time units of each scheduling period, e.g., as shown in FIG. 5. In another design, the Node B may send the scheduling information on at least one time frequency block in the first N time units of each scheduling period, e.g., as shown in FIGS. 6 and 7. In general, the Node B may send the scheduling information in each scheduling period to convey radio resources used for the broadcast and multicast services in the current and/or subsequent scheduling period. The Node B may also periodically send a flag that indicates whether or not the scheduling information will change in an upcoming scheduling period.

In one design, each broadcast or multicast service may be sent by multiple cells in at least one time unit, and these cells may be synchronized, e.g., as shown in FIG. 3. In another design, the broadcast and multicast services may be sent by a cell and may be unsynchronized with the broadcast and multicast services sent by neighbor cells, e.g., as shown in FIG. 4.

FIG. 9 shows a design of an apparatus 900 for sending data in a cellular communication system. Apparatus 900 includes a module 912 to multiplex data for broadcast and multicast services and data for unicast services on radio resources available for transmission, and a module 914 to periodically send scheduling information used to determine the radio resources carrying the broadcast and multicast services.

FIG. 10 shows a design of a process 1000 for receiving services in a cellular communication system. Process 1000 may be performed by a UE (as described below) or some other entity. The UE may receive scheduling information for broadcast and multicast services multiplexed with unicast services (block 1012). The UE may determine radio resources used for at least one service among the broadcast and multicast services based on the scheduling information (block 1014). The UE may then process transmissions received on the radio resources to recover data for the at least one service (block 1016).

The UE may receive scheduling information in a scheduling period, and may determine the radio resources used for the at least one service in the scheduling period based on the scheduling information. In one design, each service may be sent on all available radio resources in at least one time unit, and the UE may determine the time unit(s) in which each service is sent based on the scheduling information, e.g., as shown in FIG. 5. In another design, each service may be sent in at least one time frequency block, and the UE may determine the time frequency block(s) used for each service based on the scheduling information, e.g., as shown in FIG. 6. In yet another design, each service may be sent in at least one time frequency block in at least one time unit. The UE may determine (i) the time unit(s) in which each service is sent based on the scheduling information, and (ii) the time frequency block(s) used for each service based on control information sent in the time unit(s), e.g., as shown in FIG. 7.

FIG. 11 shows a design of an apparatus 1100 for receiving data in a cellular communication system. Apparatus 1100 includes a module 1112 to receive scheduling information for broadcast and multicast services multiplexed with unicast services, a module 1114 to determine radio resources used for at least one service among the broadcast and multicast services based on the scheduling information, and a module 1116 to process transmissions received on the radio resources to recover data for the at least one service.

The modules in FIGS. 9 and 11 may comprise processors, electronics devices, hardware devices, electronics components, logical circuits, memories, etc., or any combination thereof.

A UE may receive the MSCH in each scheduling period and obtain scheduling information used to receive the MBMS services. The configurations of the E-MBMS services may change infrequently. Each E-MBMS service may be sent at a constant bit rate and may be allocated the same radio resources from scheduling period to scheduling period. The content of the MSCH may thus change infrequently. In this case, it may be desirable for the UE to reduce its activity by receiving the MSCH only when necessary and receiving the E-MBMS service(s) of interest from the same resources in each scheduling period.

In another aspect, a mechanism may be used to notify the UEs when the scheduling information on the MSCH changes. In one design, the system information may include an MSCH change indicator flag, which may be referred to as simply a change flag. This change flag may be set to (i) a first value (e.g., 0) to indicate that the MSCH will not change in an upcoming scheduling period or (ii) a second value (e.g., 1) to indicate that the MSCH will change in the upcoming scheduling period. The change flag may be sent at least once per scheduling period. A UE may read the change flag and determine whether or not to receive the MSCH based on the value of the change flag.

Figure 12:
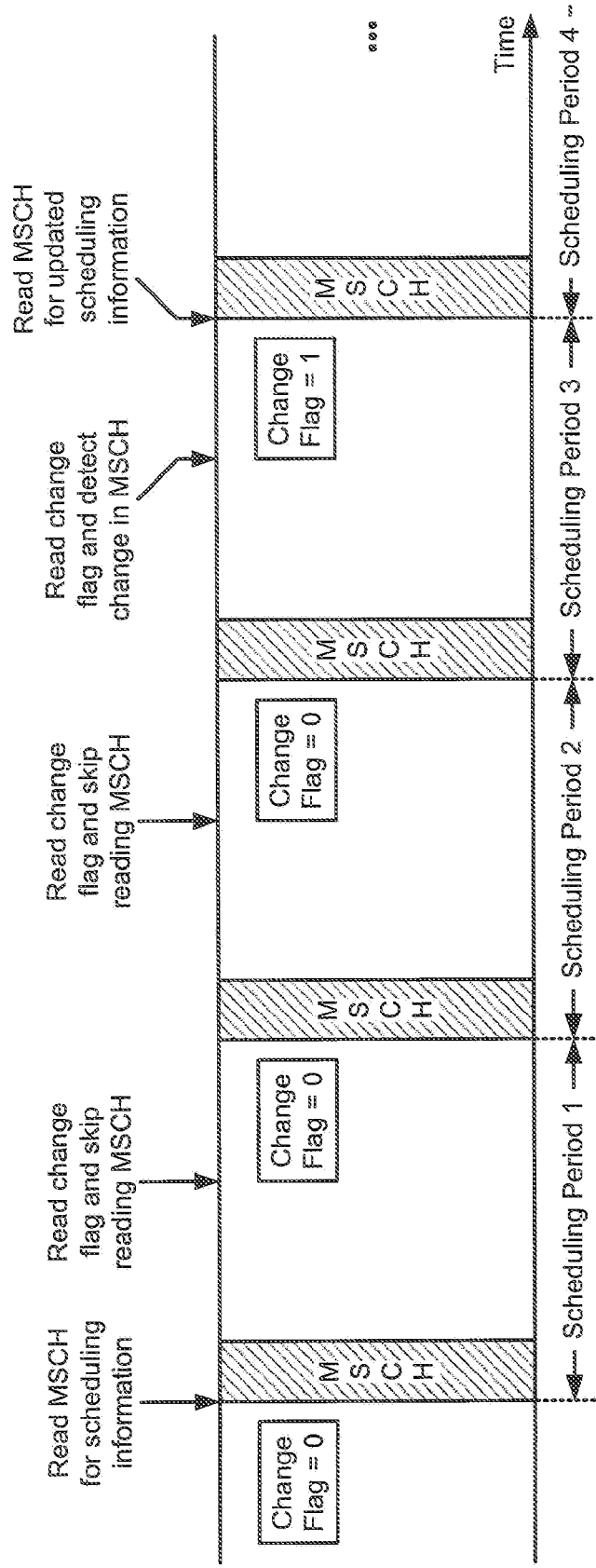
FIG. 12 shows a design of sending a change flag for scheduling information.

FIG. 12 shows a design of sending the MSCH change indicator flag. In this design, the MSCH is sent at the start of each scheduling period, and the D-BCH is also sent in each scheduling period. The D-BCH may carry the change flag as part of the system information. In the example shown in FIG. 12, the content of the MSCH does not change in scheduling periods 1, 2 and 3, and the change flag for each of these scheduling periods may be set to 0. The content of the MSCH changes in scheduling period 4, and the change flag for scheduling period 4 (which may be sent in prior scheduling period 3) may be set to 1.

A UE may receive the MSCH in scheduling period 1 and obtain scheduling information from the MSCH. The UE may use the scheduling information to receive E-MBMS services in scheduling period 1 as well as in scheduling periods 2 and 3 since the change flag is set to 0. The UE may detect the change flag being set to 1 for scheduling period 4 and may then receive the MSCH in this scheduling period. The UE may use the scheduling information obtained from the MSCH in scheduling period 4 for each subsequent scheduling period in which the change flag is set to 0.

In yet another aspect, a value tag may be used to detect for changes in the part of the system information carrying the MSCH change indicator flag. The system information may be partitioned into L parts, and each part may be sent in a respective message, where in general L may be one or greater. Each part may be associated with a value tag that may indicate the version of the information being sent in that part. The value tag for each part may be incremented each time that part changes and may be used by the UEs to determine whether or not they need to read that part. For example, if a UE last reads version 3 of a particular message and observes that the system is now transmitting version 4, then the UE may read the message and obtain updated information sent in the message.

A UE may read the system information periodically in order to have current information. The MSCH change indicator flag may be sent in one part of the system information, which may be referred to as the flag carrying part. Whenever the UE receives the flag carrying part, the UE may store the value tag of this part. The UE may periodically receive the value tag of the flag carrying part. If the received value tag matches the stored value tag, then the UE can ascertain that the flag carrying part, and hence the change flag, has not changed since the UE last reads this part. In this case, the UE does not need to read the flag carrying part and in particular does not need to read the change flag. If the value tag has changed, e.g., during scheduling period 3, then the UE may read the flag carrying part and obtain the change flag. The UE may then read the MSCH if the change flag is set to 1 and may skip reading the MSCH if the change flag is set to 0.

FIG. 13 shows a design of a process 1300 for sending scheduling information in a cellular communication system. Process 1300 may be performed by a Node B (as described below) or some other entity. The Node B may periodically send scheduling information for broadcast and multicast services in each scheduling period (block 1312). The Node B may periodically send a flag indicating whether or not the scheduling information will change in an upcoming scheduling period (block 1314). The Node B may periodically send the flag in a part of system information associated with a value tag and may update the value tag whenever this part changes.

FIG. 14 shows a design of an apparatus 1400 for sending scheduling information in a cellular communication system. Apparatus 1400 includes a module 1412 to periodically send scheduling information for broadcast and multicast services in each scheduling period, and a module 1414 to periodically send a flag indicating whether or not the scheduling information will change in an upcoming scheduling period.

FIG. 15 shows a design of a process 1500 for receiving scheduling information in a cellular communication system. Process 1500 may be performed by a UE (as described below) or some other entity. The UE may receive scheduling information for broadcast and multicast services in a first scheduling period (block 1512). The UE may receive a flag indicating whether or not the scheduling information will change in a second scheduling period (block 1514). The UE may receive the scheduling information in the second scheduling period if the flag indicates that the scheduling information will change (block 1516). The UE may skip receiving the scheduling information in the second scheduling period if the flag indicates that the scheduling information will not change (block 1518).

The UE may receive a part of system information comprising the flag and a value tag. The UE may receive the flag only if the value tag indicates that this part of the system information has changed. The UE may receive the scheduling information in the second scheduling period only if the flag is received and indicates that the scheduling information will change.

FIG. 16 shows a design of an apparatus 1600 for receiving scheduling information in a cellular communication system. Apparatus 1600 includes a module 1612 to receive scheduling information for broadcast and multicast services in a first scheduling period, a module 1614 to receive a flag indicating whether or not the scheduling information will change in a second scheduling period, a module 1616 to receive the scheduling information in the second scheduling period if the flag indicates that the scheduling information will change, and a module 1618 to skip receiving the scheduling information in the second scheduling period if the flag indicates that the scheduling information will not change.

The modules in FIGS. 14 and 16 may comprise processors, electronics devices, hardware devices, electronics components, logical circuits, memories, etc., or any combination thereof.

Figure 17:
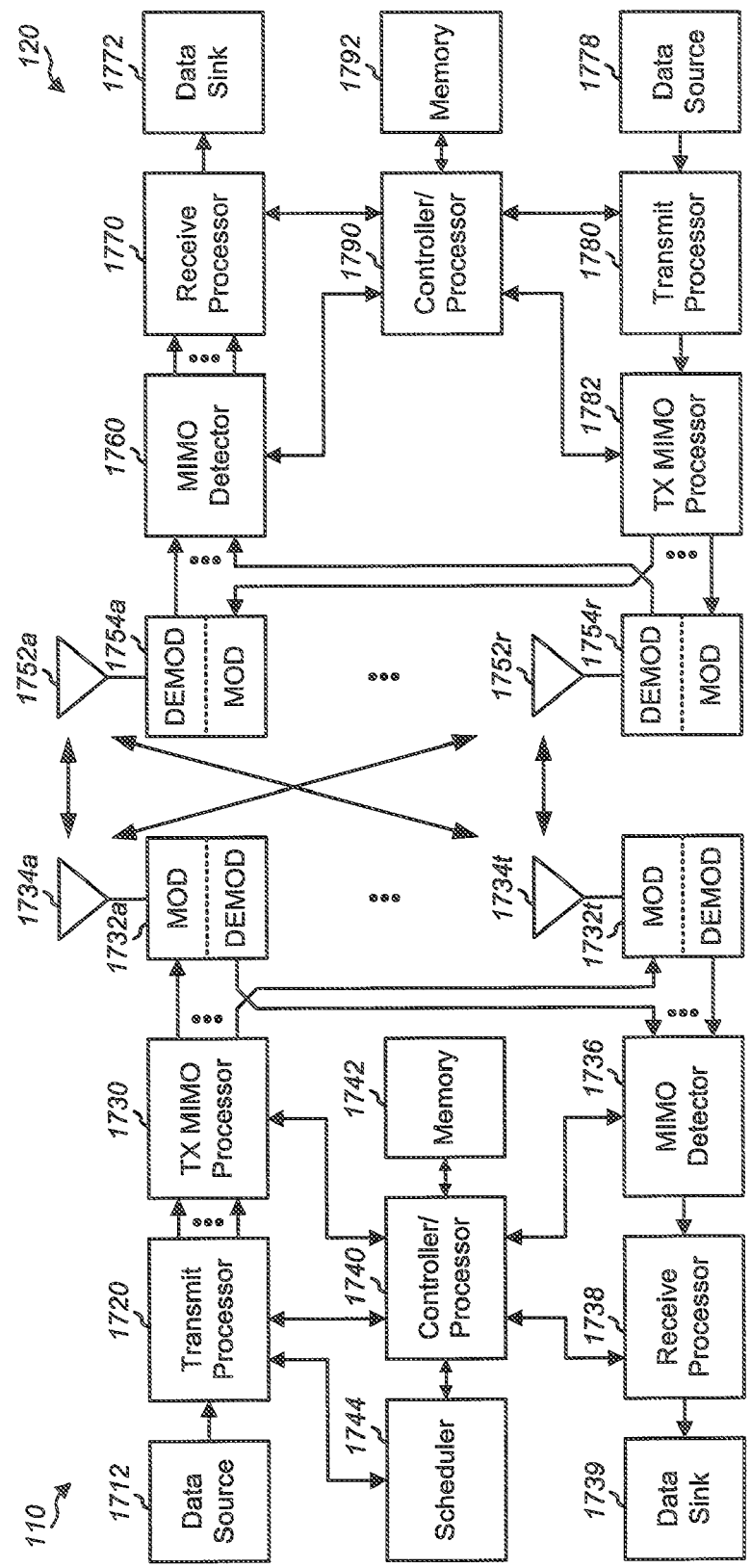
FIG. 17 shows a block diagram of a Node B and a UE.

FIG. 17 shows a block diagram of a design of Node B 110 and UE 120, which may be one of the Node Bs and one of the UEs in FIG. 1. In this design, Node B 110 is equipped with T antennas 1734a through 1734t, and UE 120 is equipped with R antennas 1752a through 1752r, where in general T 1 and R 1.

At Node B 110, a transmit processor 1720 may receive data for unicast services and data for broadcast and/or multicast services from a data source 1712. Transmit processor 1720 may process the data for each service to obtain data symbols. Transmit processor 1720 may also receive scheduling information, configuration information, control information, system information and/or other overhead information from a controller/processor 1740 and/or a scheduler 1744. Transmit processor 1720 may process the received overhead information and provide overhead symbols. A transmit (TX) multiple-input multiple-output (MIMO) processor 1730 may multiplex the data and overhead symbols with pilot symbols, process (e.g., precode) the multiplexed symbols, and provide T output symbol streams to T modulators (MOD) 1732a through 1732t. Each modulator 1732 may process a respective output symbol stream (e.g., for OFDM) to obtain an output sample stream. Each modulator 1732 may further process (e.g., convert to analog, amplify, filter, and upconvert) the output sample stream to obtain a downlink signal. T downlink signals from modulators 1732a through 1732t may be transmitted via T antennas 1734a through 1734t, respectively.

At UE 120, antennas 1752a through 1752r may receive the downlink signals from Node B 110 and provide received signals to demodulators (DEMOD) 1754a through 1754r, respectively. Each demodulator 1754 may condition (e.g., filter, amplify, downconvert, and digitize) a respective received signal to obtain received samples and may further process the received samples (e.g., for OFDM) to obtain received symbols. A MIMO detector 1760 may receive and process the received symbols from all R demodulators 1754a through 1754r and provide detected symbols. A receive processor 1770 may process the detected symbols, provide decoded data for UE 120 and/or desired services to a data sink 1772, and provide decoded overhead information to a controller/processor 1790. In general, the processing by MIMO detector 1760 and receive processor 1770 is complementary to the processing by TX MIMO processor 1730 and transmit processor 1720 at Node B 110.

On the uplink, at UE 120, data from a data source 1778 and overhead information from a controller/processor 1790 may be processed by a transmit processor 1780, further processed by a TX MIMO processor 1782 (if applicable), conditioned by modulators 1754a through 1754r, and transmitted via antennas 1752a through 1752r. At Node B 110, the uplink signals from UE 120 may be received by antennas 1734, conditioned by demodulators 1732, detected by a MIMO detector 1736, and processed by a receive processor 1738 to obtain the data and overhead information transmitted by UE 120.

Controllers/processors 1740 and 1790 may direct the operation at Node B 110 and UE 120, respectively. Controller/processor 1740 may implement or direct process 800 in FIG. 8, process 1300 in FIG. 13, and/or other processes for the techniques described herein. Controller/processor 1790 may implement or direct process 1000 in FIG. 10, process 1500 in FIG. 15, and/or other processes for the techniques described herein. Memories 1742 and 1792 may store data and program codes for Node B 110 and UE 120, respectively. Scheduler 1744 may schedule UEs for downlink and/or uplink transmission, schedule transmission of broadcast and multicast services, and provide assignments of radio resources for the scheduled UEs and services. Controller/processor 1740 and/or scheduler 1744 may generate scheduling information and/or other overhead information for the broadcast and multicast services.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of sending data in a cellular communication system, comprising:
   multiplexing data for a plurality of different broadcast or multicast services and data for unicast services on radio resources available for transmission; and
   periodically sending, for each of a plurality of scheduling periods that each include a plurality of sub-frames, scheduling information that indicates allocations of a set of time frequency blocks to each of the plurality of different broadcast or multicast services that have data for transmission in a given scheduling period, wherein the set of time frequency blocks are selected at a Coordinating Entity configured to coordinate one or more of (A) non-synchronized single-cell transmission for one or more of the plurality of different broadcast or multicast services in at least one of a plurality of cells and (B) synchronous multi-cell transmission of one or more other of the plurality of different broadcast or multicast services at the plurality of cells, so as to maintain a set of radio resources unassigned to any broadcast or multicast service in each of the plurality of cells to permit scheduling of cell-specific unicast services in the given scheduling period within the set of radio resources in any of the plurality of cells, and wherein each allocated set of time frequency blocks in the given scheduling period is different from each other allocated set of time frequency blocks in the given scheduling period.

2. The method of claim 1, wherein each allocated set of time frequency blocks in the given scheduling period includes a set of the plurality of sub-frames in the given scheduling period that is different from one or more sub-frames included in one or more other allocated sets of time frequency blocks in the given scheduling period.

3. The method of claim 2, wherein the sets of the plurality of sub-frames included in the allocated sets of time frequency blocks overlap at least partially.

4. The method of claim 1, wherein each allocated set of time frequency blocks includes a frequency in the given scheduling period that is different from one or more frequencies included in one or more other allocated sets of time frequency blocks in the given scheduling period.

5. The method of claim 4, wherein the frequency for at least one of the allocated sets of time frequency blocks and another frequency for at least one other of the allocated sets of time frequency blocks overlap at least partially.

6. A method of receiving data in a cellular communication system, comprising:
   periodically receiving, for each of a plurality of scheduling periods that each include a plurality of sub-frames, scheduling information that indicates allocations of a set of time frequency blocks to each of a plurality of different broadcast or multicast services that have data for transmission in a given scheduling period, wherein each allocated set of time frequency blocks is selected at a Coordinating Entity configured to coordinate one or more of (A) non-synchronized single-cell transmission for one or more of the plurality of different broadcast or multicast services in at least one of a plurality of cells and (B) synchronous multi-cell transmission of one or more other of the plurality of different broadcast or multicast services at the plurality of cells, so as to maintain a set of radio resources unassigned to any broadcast or multicast service in each of the plurality of cells to permit scheduling of cell-specific unicast services in the given scheduling period within the set of radio resources in any of the plurality of cells, and wherein each allocated set of time frequency blocks in the given scheduling period is different from each other allocated set of time frequency blocks in the given scheduling period;
   selecting at least one of the plurality of different broadcast or multicast services for at least one of the plurality of scheduling periods; and
   monitoring the selected at least one of the plurality of different broadcast or multicast services for the at least one of the plurality of scheduling periods at a corresponding allocated set of time frequency blocks within the at least one of the plurality of scheduling periods.

7. The method of claim 6, wherein each allocated set of time frequency blocks in the given scheduling period includes a set of the plurality of sub-frames in the given scheduling period that is different from one or more sub-frames included in one or more other allocated sets of time frequency blocks in the given scheduling period.

8. The method of claim 7, wherein the sets of the plurality of sub-frames included in the allocated sets of time frequency blocks overlap at least partially.

9. The method of claim 6, wherein each allocated set of time frequency blocks includes a frequency in the given scheduling period that is different from one or more frequencies included in one or more other allocated sets of time frequency blocks in the given scheduling period.

10. The method of claim 9, wherein the frequency for at least one of the allocated sets of time frequency blocks and another frequency for at least one other of the allocated sets of time frequency blocks overlap at least partially.

11. The method of claim 6, wherein the selected at least one different broadcast or multicast service is among the one or more different broadcast or multicast services being transmitted in accordance with the non-synchronized single-cell transmission.

12. The method of claim 6, wherein the selected at least one different broadcast or multicast service is among the one or more other different broadcast or multicast services being transmitted in accordance with the synchronous multi-cell transmission.

13. An apparatus configured to send data in a cellular communication system, comprising:
   at least one processor configured to multiplex data for a plurality of different broadcast or multicast services and data for unicast services on radio resources available for transmission;
   at least one antenna that is coupled to the at least one processor and is configured to send, for each of a plurality of scheduling periods that each include a plurality of sub-frames, scheduling information that indicates allocations of a set of time frequency blocks to each of the plurality of different broadcast or multicast services that have data for transmission in a given scheduling period, wherein the set of time frequency blocks are selected at a Coordinating Entity configured to coordinate one or more of (A) non-synchronized single-cell transmission for one or more of the plurality of different broadcast or multicast services in at least one of a plurality of cells and (B) synchronous multi-cell transmission of one or more other of the plurality of different broadcast or multicast services at the plurality of cells, so as to maintain a set of radio resources unassigned to any broadcast or multicast service in each of the plurality of cells to permit scheduling of cell-specific unicast services in the given scheduling period within the set of radio resources in any of the plurality of cells, and wherein each allocated set of time frequency blocks in the given scheduling period is different from each other allocated set of time frequency blocks in the given scheduling period; and
   a memory coupled to the at least one processor.

14. The apparatus of claim 13, wherein each allocated set of time frequency blocks in the given scheduling period includes a set of the plurality of sub-frames in the given scheduling period that is different from one or more sub-frames included in one or more other allocated sets of time frequency blocks in the given scheduling period.

15. The apparatus of claim 14, wherein the sets of the plurality of sub-frames included in the allocated sets of time frequency blocks overlap at least partially.

16. The apparatus of claim 13, wherein each allocated set of time frequency blocks includes a frequency in the given scheduling period that is different from one or more frequencies included in one or more other allocated sets of time frequency blocks in the given scheduling period.

17. The apparatus of claim 16, wherein the frequency for at least one of the allocated sets of time frequency blocks and another frequency for at least one other of the allocated sets of time frequency blocks overlap at least partially.

18. An apparatus configured to receive data in a cellular communication system, comprising:
   at least one processor that is coupled to at least one antenna and configured to:
      periodically receive, for each of a plurality of scheduling periods that each include a plurality of sub-frames, scheduling information that indicates allocations of a set of time frequency blocks to each of a plurality of different broadcast or multicast services that have data for transmission in a given scheduling period, wherein each allocated set of time frequency blocks is selected at a Coordinating Entity configured to coordinate one or more of (A) non-synchronized single-cell transmission for one or more of the plurality of different broadcast or multicast services in at least one of a plurality of cells and (B) synchronous multi-cell transmission of one or more other of the plurality of different broadcast or multicast services at the plurality of cells, so as to maintain a set of radio resources unassigned to any broadcast or multicast service in each of the plurality of cells to permit scheduling of cell-specific unicast services in the given scheduling period within the set of radio resources in any of the plurality of cells, and wherein each allocated set of time frequency blocks in the given scheduling period is different from each other allocated set of time frequency blocks in the given scheduling period;
      select at least one of the plurality of different broadcast or multicast services for at least one of the plurality of scheduling periods; and
      monitor the selected at least one of the plurality of different broadcast or multicast services for the at least one of the plurality of scheduling periods at a corresponding allocated set of time frequency blocks within the at least one of the plurality of scheduling periods; and
   a memory coupled to the at least one processor.

19. The apparatus of claim 18, wherein each allocated set of time frequency blocks in the given scheduling period includes a set of the plurality of sub-frames in the given scheduling period that is different from one or more sub-frames included in one or more other allocated sets of time frequency blocks in the given scheduling period.

20. The apparatus of claim 19, wherein the sets of the plurality of sub-frames included in the allocated sets of time frequency blocks overlap at least partially.

21. The apparatus of claim 18, wherein each allocated set of time frequency blocks includes a frequency in the given scheduling period that is different from one or more frequencies included in one or more other allocated sets of time frequency blocks in the given scheduling period.

22. The apparatus of claim 21, wherein the frequency for at least one of the allocated sets of time frequency blocks and another frequency for at least one other of the allocated sets of time frequency blocks overlap at least partially.

* * * * *